United States Patent [19]

Nitz

[11] 4,373,271
[45] Feb. 15, 1983

[54] SOLID STATE COMPASS

[75] Inventor: Larry T. Nitz, Sterling Heights, Mich.

[73] Assignee: General Motors Corporation, Detroit, Mich.

[21] Appl. No.: 215,268

[22] Filed: Dec. 11, 1980

[51] Int. Cl.³ .............................................. G01C 17/30
[52] U.S. Cl. ..................................... 33/361; 324/251; 324/260
[58] Field of Search ............... 324/251, 240, 247, 246, 324/260; 33/361, 362

[56] References Cited

U.S. PATENT DOCUMENTS

| 2,047,609 | 7/1936  | Antrankian ..................... 324/247 X |
| 3,425,648 | 2/1969  | Wipfe et al. .                              |
| 3,991,361 | 11/1976 | Mattern et al. .                            |
| 4,267,640 | 5/1981  | Wu ......................................... 33/361 |
| 4,302,746 | 11/1981 | Searzello et al. ................... 324/247 |

Primary Examiner—William D. Martin, Jr.
Attorney, Agent, or Firm—Mark A. Navarre

[57] ABSTRACT

The magnetic field strengths in two perpendicularly oriented ferromagnetic core members are converted to voltages and summed to form a composite field strength voltage. The core members are mounted in a vehicle and the slope polarity and amplitude of the composite field strength voltage are used to determine the heading of the vehicle.

3 Claims, 3 Drawing Figures

SOLID STATE COMPASS

This invention relates to a magnetic compass for a vehicle and more particularly to a heading indicator utilizing solid state components and having no moving parts.

Vehicle heading detectors typically comprise a magnetic needle supported at its center in a pool of viscous fluid. The needle is responsive to the earth's magnetic field and tends to point in the direction of the earth's magnetic north pole. Due to the obvious shortcomings of the swinging needle compass, electronic or static compasses have been developed, especially for aircraft navigation applications. Such systems comprise stationary coils and/or ferromagnetic cores mounted in a predetermined orientation with respect to the heading of the vehicle or aircraft. The earth establishes a variable magnetic field in the cores or windings as a function of their orientation with respect to the earth's magnetic north pole, and sensing devices such as Hall Effect sensors convert the field strength thereby established into an electrical signal that may be processed to determine heading information. This invention particularly relates to a circuit for processing the magnetic field strength signals to determine heading. Prior art signal processing circuits (as exemplified in U.S. Pat. Wipff et al Nos. 3,425,648 and Mattern et al 3,991,361) phase-shift one of the sensor outputs by 90 degrees, combine the phase-shifted output with the other sensor output, and measure the phase displacement of the combined signal relative to a reference signal to determine the vehicle heading. While the above described processing technique may be adequate, it is unduly complicated and expensive to implement.

Accordingly, it is an object of this invention to provide an improved electronic compass using simple digital signal processing circuitry.

It is a further object of this invention to provide an electronic compass wherein signals indicative of the earth's magnetic field strength in longitudinal and transverse ferromagnetic members are summed to form a composite signal and wherein heading information is determined as a function of the amplitude and slope of the composite signal.

These objects are carried forward with a pair of mutually perpendicular ferromagnetic cores mounted in a predetermined orientation with respect to the front of the vehicle. Hall Effect sensors are used to develop electrical signals as a function of the magnetic field strength in each core, and the signals are summed to form a composite signal, the amplitude of which varies as a function of the heading of the vehicle relative to the earth's magnetic north pole. The relative magnitudes of the Hall Effect sensor output signals provide information as to the slope of the composite signal, and the slope polarity along with the composite signal amplitude are decoded to determine the vehicle heading. The decoded heading information is then used to drive a visual display to conveniently indicate the heading to the operator of the vehicle.

The circuitry required to perform the signal processing of this invention may comprise conventional digital logic elements in contrast to prior art systems requiring phase shifters and phase decoders.

FIG. 2A illustrates the Hall Effect output voltages as a function of the heading direction and FIG. 2B illustrates the composite signal voltage as a function of the heading direction.

Figure 1:
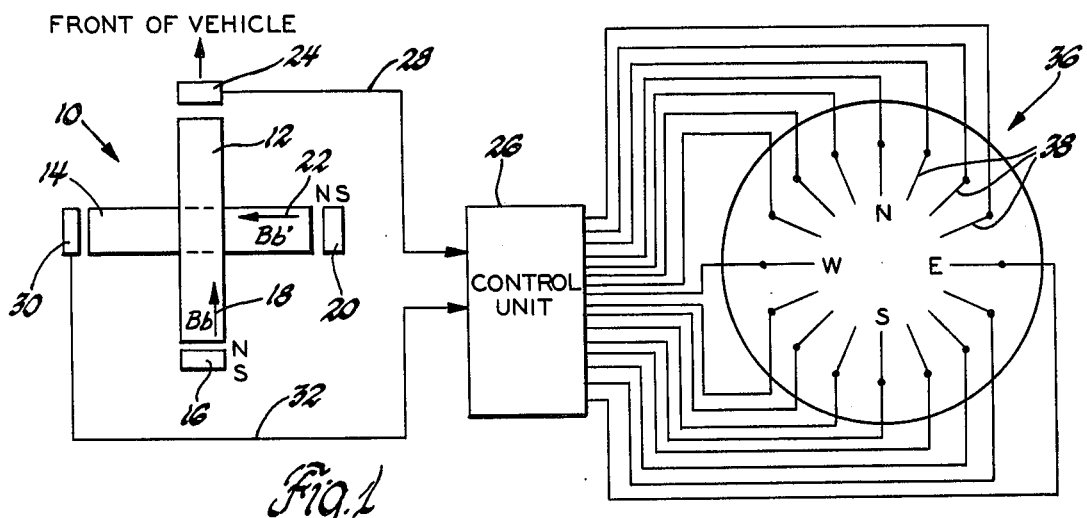
FIG. 1 is a schematic diagram of the solid state compass of this invention.

Referring now to FIG. 1, reference numeral 10 generally designates the magnetic field sensing portion of this invention. Ferromagnetic cores 12 and 14 are mutually perpendicular and oriented in the vehicle so that core member 12 faces the front of the vehicle as indicated. Permanent magnet 16 is mounted on or near one end of core member 12 and induces a reference magnetic field therein as designated by reference numeral 18. Similarly permanent magnet 20 is mounted on or near one end of core member 14 and induces a reference magnetic field therein as designated by reference numeral 22. The earth also induces a magnetic field in each core member 12 and 14, and depending on the orientation of the core members with respect to earth's magnetic north pole, the field may aid or oppose the reference fields 18 and 22 induces by permanent magnets 16 and 20. If the vehicle is facing earth's magnetic north pole, for example, a magnetic field will be induced in core member 12 directly opposing the field induced by permanent magnet 16. In this case, no magnetic field would be induced along the longitudinal axis of core member 14 since the earth's magnetic field would be perpendicular thereto. In this regard it will be appreciated that the earth's magnetic field along the longitudinal axis of each core member will vary as a function of the Cosine of the angle between the longitudinal axis of the core member and the earth's magnetic north pole. Accordingly, the resultant magnetic field strength in each core member 12 and 14 varies about the reference field strength induced by permanent magnets 16 and 20 as a function of the heading of the vehicle.

Since core members 12 and 14 are mutually perpendicular, the field strength in one core member will not affect the field strength in the other. Thus, core members 12 and 14 may be formed separately or as a single unit.

Hall Effect sensors 24 and 30 are mounted at the unbiased ends of core members 12 and 14 respectively. Each sensor 24 and 30 operates in a well known manner to convert a sensed magnetic field strength to an electrical voltage. Thus the voltage outputs of sensors 24 and 30 vary as a function of vehicle heading as shown in FIG. 2A by reference numerals 50 and 52. Eb is a DC voltage level corresponding to the reference magnetic fields induced in core members 12 and 14 by permanent magnets 16 and 20. The placement and strength of permanent magnets 16 and 20 determine the magnitudes of reference field strengths 18 and 22, and the reference field strength level is preferably set so that the resultant magnetic field strength excursions within core members 12 and 14 occur in the most sensitive operating regions of Hall sensors 24 and 30. In addition, the air gaps between permanent magnets 16 and 20 and the respective core members 12 and 14 may be adjusted for directional calibration. The output voltages of sensors 24 and 30 are applied as inputs to control unit 26 via conductors 28 and 32.

Control unit 26 contains signal processing circuitry as will be described in reference to FIG. 3 for decoding the Hall Effect sensor output voltages 50 and 52 to determine the heading of the vehicle.

Reference numeral 36 generally designates a visual indicating device driven by control unit 26 for indicating the heading of the vehicle. Each line such as designated by reference numeral 38 represents a display segment that is lighted in response to the application of a signal voltage thereto. Control unit 26 has 16 output lines—one connected to each display segment 38 of visual indicator 36 as shown. Control unit 26 is adapted as will later be explained to energize an output line for lighting the display segment 38 most closely corresponding to the heading of the vehicle. Heading indications may be inscribed on indicator 36 in the typical compass configuration as shown for ease of reading by the operator or navigator. It will, of course, be appreciated that a more specific readout could be provided if desired.

Figure 3:
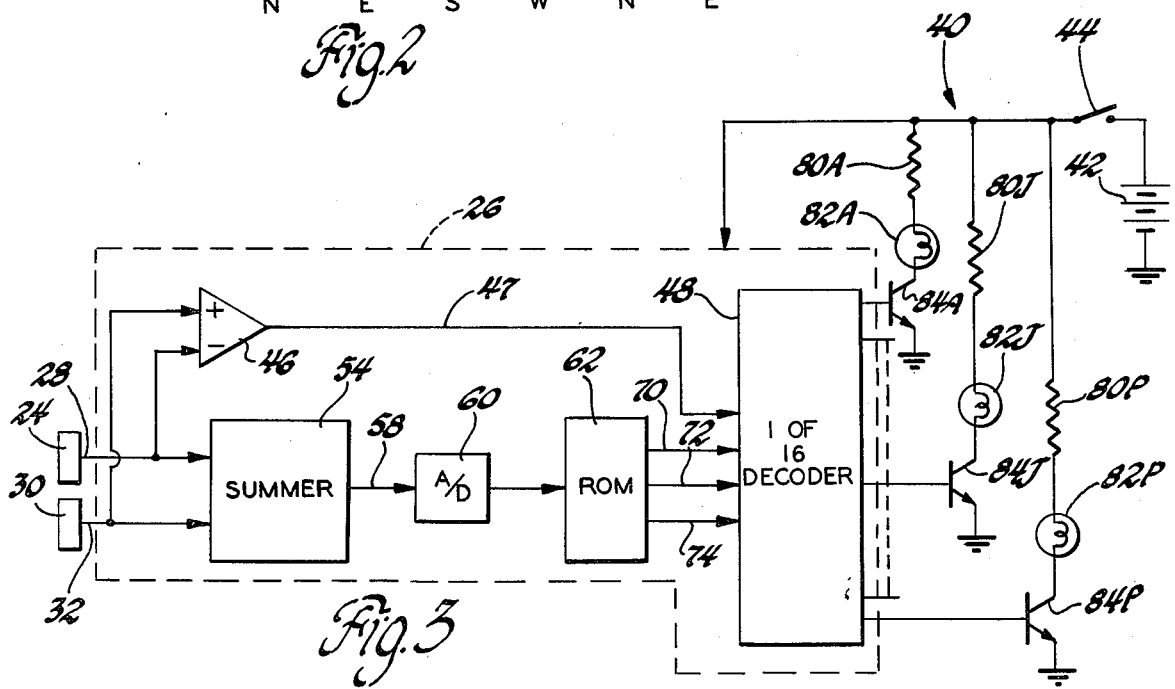
FIG. 3 is a circuit diagram of the signal processing circuitry of this invention.

Referring not to FIG. 3, reference numeral 26 designates the control unit of this invention, comprised entirely of conventional off-the-shelf devices. As shown in FIG. 1 the outputs of Hall Effect sensors 24 and 30 are applied as inputs to control unit 26 via conductors 28 and 32. The output circuitry of control unit 26 is designated generally by reference numeral 40 and operates to light visual indicator device 36 as will later be described. Battery 42 provides a supply voltage through ignition switch 44 to output circuitry 40 and to control unit 26.

The output voltages of Hall Effect sensors 24 and 30 are applied as inputs to comparator 46, the output of which is connected as an input to 1-of-16 decoder 48 via conductor 47. As indicated by the polarity of the comparator inputs, the output of comparator 46 is a logic 1 when the voltage on conductor 32 (output voltage 52) exceeds the voltage on conductor 28 (output voltage 50) and its output is a logic 0 when the voltage on conductor 28 exceeds the voltage on conductor 32. Summer 54 receives the Hall Effect output voltages 50 and 52 as inputs and sums then to form a composite voltage on conductor 58. The composite output voltage of summer 54 is designated by reference numeral 56 and varies as a function of heading as shown in FIG. 2B. The composite output voltage on conductor 58 is applied as an input to analog-to-digital (A/D) converter 60, and the digital output of A/D converter 60 is applied as an address input to read-only-memory (ROM) 62. As will later be explained, ROM 62 contains previously stored data values and serves to linearize the digital output of A/D converter 60 with respect to vehicle heading. The output of ROM 62 is a three-bit digital number and is applied to 1-of-16 decoder 48 via conductors 70, 72 and 74. As will be well known to those skilled in the art, decoder 48 operates to energize a predetermined output line in response to the application of a corresponding digital number to its input.

Output circuit 40 comprises 16 identical lamp driver circuits—one for each display segment 38 of heading display 36. Each circuit comprises a current limiting resistor 80A-80P, a lamp 82A-82P, and a switching transistor 84A-84P. For the sake of simplicity only three of the circuits (A, J and P) are shown. The base or control input of each switching transistor 84A-84P is connected to an output line of decoder 48 so that whenever a decoder output line assumes a logic 1 voltage level, the switching transistor 84A-84P connected to it becomes conductive to light its associated lamp 82A-82P. Lamps 82A-82P are so positioned with respect to heading indicator 36 that each lamp is adapted to illuminate a display segment 38 when lit.

Figure 2:
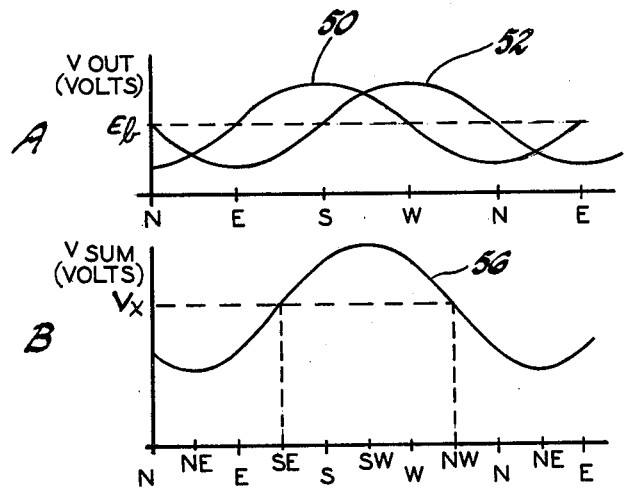
FIG. 2 is a graphical illustration of the signal processing voltages.

It will be seen in reference to FIG. 2 that the amplitude of composite voltage 56 varies as a function of the heading of the vehicle. Accordingly, the amplitude of voltage 56 is measured in A/D converter 60 and used to address ROM 62 in which the various heading directions are stored as a function of the digital voltage amplitude of composite signal 56. ROM 62 thus operates to linearize the magnitude of composite voltage 56 with respect to vehicle heading. However, the amplitude of composite signal 56 provides insufficient information from which to determine the heading of the vehicle since for a given measured voltage amplitude $V_x$, there are two possible vehicle headings (SE or NW) as indicated in FIG. 2B. This ambiguity is resolved by comparator 46 which compares the output voltages of Hall Effect sensors 24 and 30. If output voltage 50 exceeds output voltage 52, the measured voltage $V_x$ is on the positive slope of composite signal 56 and the heading is SE. If, on the other hand, voltage 52 exceeds voltage 50, the measured voltage $V_x$ lies on the negative slope of composite signal 56 and the heading is NW. Accordingly, the output of comparator 46 is connected via conductor 47 as an input to decoder 48 along with the heading information from ROM 62. If the output of comparator 46 is a logic 1, a heading corresponding to the negative slope of composite signal 56 is lighted on display indicator 36 while if the output of comparator 46 is a logic 0, a heading corresponding to the positive slope of composite signal 56 is lighted.

Although a specific embodiment has been illustrated in order to provide a complete understanding of the invention, it will be recognized that various modifications or substitutions may be made and that the scope of this invention extends to such and is limited only by the appended claims. As an example of such a substitution, permanent magnets 16 and 20 may each be replaced by an electric coil wound around the respective core member 12 or 14 and fed by a constant current source. With the above arrangement, directional calibration may be accomplished by adjusting the source current value.

The embodiments of the invention in which an exclusive property or privilege is claimed are defined as follows:

1. A motor vehicle compass comprising:
   perpendicularly oriented ferromagnetic core members mounted in a predetermined relationship with respect to the heading of said vehicle;
   sensing means associated with each of said core members for providing an electrical signal determined as a function of the magnetic field strength therein, the magnetic field strength in said core members varying as a function of the orientation of said core members relative to the earth's magnetic field;
   means responsive to said sensing means for summing said electrical signals to form a composite field intensity signal;
   means responsive to the relative magnitudes of said electrical signals and to the amplitude of said composite signal for developing a direction signal indicative of the heading of the vehicle; and
   means responsive to said direction signal for visually displaying the heading of the vehicle.

2. A motor vehicle compass comprising:
   perpendicularly oriented ferromagnetic core members mounted in a predetermined relationship with respect to the heading of said vehicle;
   means for establishing a reference magnetic field in each of said core members;

sensing means associated with each of said core members including a Hall Effect device for providing an electrical voltage determined in accordance with the magnetic field strength in a respective core member, the magnetic field strength in said core member varying as a function of the alignment of said core member relative to the earth's magnetic field;

means responsive to said sensing means for summing said electrical voltages to form a composite voltage;

means responsive to the relative magnitudes of said electrical voltages and to the amplitude of said composite voltage for developing a direction signal indicative of the heading of the vehicle; and means responsive to said direction signal for displaying the heading of the vehicle.

3. A vehicle compass comprising:

perpendicularly oriented ferromagnetic core members mounted in a predetermined relationship with respect to the heading of said vehicle;

sensing means associated with each of said core members for providing an electrical signal determined as a function of the magnetic field strength therein, the magnetic field strength in said core members varying as a function of the alignment of said core members relative to the earth's magnetic field;

means responsive to said sensing means for summing said electrical signals to form a composite field intensity signal;

means for retrieving a previously determined direction signal as a function of the amplitude of said composite signal;

means responsive to the relative magnitudes of said electrical signals for developing a slope signal indicative of the slope polarity of said composite signal;

means for decoding said slope signal and said direction signal to develop a heading signal, said slope signal being used to resolve ambiguity in said direction signal; and means responsive to said heading signal for displaying the heading of the vehicle.

* * * * *